United States Patent
Jang

[19]

[11] Patent Number: 6,024,200
[45] Date of Patent: Feb. 15, 2000

[54] N-R CONTROL VALVE OF A HYDRAULIC CONTROL SYSTEM FOR AUTOMATIC TRANSMISSIONS

[75] Inventor: Jaeduk Jang, Seoul, Rep. of Korea

[73] Assignee: Hyundai Motor Company, Seoul, Rep. of Korea

[21] Appl. No.: 08/917,875

[22] Filed: Aug. 27, 1997

[30] Foreign Application Priority Data

Aug. 30, 1996 [KR] Rep. of Korea .................. 96-36774

[51] Int. Cl.[7] ............................... F15B 13/042
[52] U.S. Cl. ......................... 192/85 R; 137/625.64; 137/625.66; 137/625.68
[58] Field of Search ................. 137/625.64, 625.66, 137/625.68; 192/85 R

[56] References Cited

U.S. PATENT DOCUMENTS

| | | | |
|---|---|---|---|
| 3,486,801 | 12/1969 | Frayer | 137/625.64 X |
| 4,052,930 | 10/1977 | Hiramatsu et al. | 137/625.64 X |
| 5,031,663 | 7/1991 | Fukuta et al. | 137/625.64 |

FOREIGN PATENT DOCUMENTS 4-205508  7/1992  Japan ......................... 137/625.64

*Primary Examiner*—Gerald A. Michalsky

[57] ABSTRACT

A control valve includes a valve body having a first, second and third port, and a valve spool disposed in the valve body. The valve spool has a first and second end, and includes a first, second and third land. The first land is disposed at the first end for receiving hydraulic pressure supplied via the first port to bias the valve spool in a first direction. The second land allows fluid communication between the second and third ports when the valve spool is biased in the first direction, and the third land is disposed between the first and second land. The third land includes a passage which allows fluid communication between each side of the third land. A spring biased the valve spool in a second direction, opposite the first direction.

8 Claims, 4 Drawing Sheets

N-R CONTROL VALVE OF A HYDRAULIC CONTROL SYSTEM FOR AUTOMATIC TRANSMISSIONS

FIELD OF THE INVENTION

The present invention relates to a control valve and, more particularly, to a control valve of a hydraulic control system for automatic transmissions which minimizes variations in control pressure by equally discharging oil to realize stabilization of control pressure such that shift shock is reduced.

BACKGROUND OF THE INVENTION

Generally, a conventional automatic transmission for a vehicle includes a torque converter, a multi-stage gear shift mechanism connected to the torque converter, and a plurality of friction members actuated by hydraulic pressure for selecting a gear range of the gear shift mechanism.

A hydraulic control system for automatic transmissions operates by the selection of friction members using hydraulic pressure, created by the pumping of oil by a hydraulic pump, passing through a control valve. As a result, shifting the driving state of the vehicle can be realized automatically and appropriately.

Referring to FIG. 7, the above hydraulic control system includes a torque converter 2 for transmitting torque from an engine to a gear train, and an oil pump 4 for pumping oil needed to form hydraulic pressure for controlling the torque converter 2 and each speed ratio, and to lubricate the system.

The following are interconnected to form a pressure regulator and a damper clutch controller: a pressure regulating valve 8 which regulates the pressure of the oil supplied by the oil pump 4 and flowing through a line 6, a torque converter control valve 10 which controls the pressure of oil used for the torque converter 2 and for lubrication, and a damper clutch control valve 12 for increasing power transmission efficiency of the torque converter 2.

Also, lines are formed to supply part of the oil pressure generated in the oil pump 4 to a reducing valve 14, which reduces the level of pressure so that it is lower than line pressure, and to a manual valve 16, which operates according the positioning of a select lever (not shown) by a driver and converts the supply of pressure to different lines.

Lines are formed such that the hydraulic pressure, reduced to a fixed level of pressure in the reducing valve 14, is able to be used as control pressure for a high-low pressure valve 18. The high-low pressure valve 18 reduces line pressure in a high speed range to minimize the loss of drive effectiveness of the oil pump 4, and a pressure controller is formed for supplying part of the above hydraulic pressure to a first pressure control valve 20 and a second pressure control valve 22 such that the pressure can be used as shift range control pressure.

Further, lines are formed for allowing part of the hydraulic pressure supplied to the first and second pressure control valves 20 and 22 to be used as control pressure for an N-R control valve 24', which reduces shift shock when shifting from the neutral N range to the reverse R range.

A shift control valve 28, for converting pressure lines by the operation of first and second solenoid valves S1 and S2, communicates with a line 26. Hydraulic pressure flows through the line 26 when the manual valve 16 is in a drive D range. The first and second solenoid valves S1 and S2 are ON/OFF controlled by a transmission control unit (TCU). The shift control valve 28 together with the manual valve 16 comprise is manual and automatic shift controllers As discussed in more detail below, a first speed line 44 branches off from the line 26. A second speed line 30, a third speed line 32, and a fourth speed line 34 are connected to the shift control valve 28. Shift valves of a hydraulic pressure distributor, for controlling each shift range, are connected to each of these lines such that control pressure can be supplied.

Namely, the second speed line 30 is formed to allow the supply of hydraulic pressure to a left-end port of a 1-2 shift valve 36 to control the same, the third speed line 32 is formed enabling the supply of hydraulic pressure to a left-end port of a 2-3/4-3 shift valve 38 to control the same, and the fourth speed line 34 is formed to permit the supply of hydraulic pressure to a right-end port of the 2-3/4-3 shift valve 38 and a left-end port of a 2-4/3-4 shift valve 40 to control both valves.

The first pressure control valve 20 controls line pressure under the control of a third solenoid valve S3, while the second pressure control valve 22 controls line pressure under the control of a fourth solenoid valve S4.

The first speed line 44 supplies hydraulic pressure to the first and second pressure control valves 20 and 22 and the third and fourth solenoid valves S3 and S4 operate such that hydraulic pressure is supplied to a first friction member C1, which is an input member of a first speed stage, via the 2-4/3-4 shift valve 40.

A timing control line 45 is connected to the first speed line 44 to enable line pressure flowing through the first speed line 44 to be supplied to a shift timing control valve 42.

The shift timing control valve 42 performs the function of either supplying or releasing operational pressure to a third friction member C3. The third friction member C3 acts as an input member in the third and fourth speed stages. The shift timing control valve 42 also regulates the timing for supplying hydraulic pressure to the third friction member C3 and to regulate the control timing for a second friction member C2, which operates as a reaction member, in second and fourth speed stages.

The shift timing control valve 42 is able to switch the operational pressure of the second friction member C2, operating as a reaction member, with that of the third friction member C3 when a fifth solenoid valve S5 is controlled to OFF by the TCU.

Also, a line 270 is formed to supply hydraulic pressure to the second friction member C2, operating as a reaction member of the second speed stage, from the first pressure control valve 20 via the 1-2 shift valve 36.

Further, a line 272 is formed to supply part of the hydraulic pressure flowing through the 1-2 shift valve 36 to the third friction member C3, acting as an input member in the third speed stage, via the 2-3/4-3 shift valve 38 and the shift timing control valve 42. Another line 274 is formed to supply the hydraulic pressure supplied to the third friction member C3 to a release side chamber h1 of the second friction member C2.

There is further provided a line 276 which, when the manual valve 16 is in the reverse range, supplies the hydraulic pressure supplied to a reverse first control line 46. The reverse first control line 46 supplies the hydraulic pressure to a fourth friction member C4, operating as a reaction member in the reverse R range, via the 1-2 shift valve 36. A line 278 also connects a reverse second control line 48 with the manual valve 16 to operate a fifth friction member C5, which operates as an input member.

A check valve 50 is mounted in the reverse second control line 48, and delays the release of hydraulic pressure when operational pressure is released to improve shift quality.

A kickdown switch 52 is fixed to an operational side chamber h2 of the second friction member C2. The kickdown switch 52 turns OFF when hydraulic pressure is supplied to the operational side chamber h2, turns ON when hydraulic pressure is supplied to the release side chamber h1 of the second friction member C2, and sends a signal of its state in both cases to the TCU.

So that operational pressure of the second friction member C2 can be converted according to the shift range and speed stage so as to enable skip shifting, the 2-4/3-4 shift valve 40 has ports to enable the directing of hydraulic pressure from the timing control valve 42 to the second friction member C2.

The reference S6, appearing in the drawing but not yet described, refers to a sixth solenoid valve which controls the damper clutch control valve 12 to either operate or discontinue the operation of the same.

In the above structure, hydraulic pressure is supplied to the first friction member C1 in the forward first speed stage; to the release side chamber h1 of the second friction member C2 and the operational side chamber h2 of the second friction member C2 in the forward second speed stage; to the first friction member C1, the operational side chamber h2 of the second friction member C2, and the third friction member C3 in the forward third speed stage; to the third friction member C3 and the operational side chamber h2 of the second friction member C2 in the forward fourth speed stage; and to the fourth and fifth friction members C4 and C5 in the reverse R range.

In the above hydraulic control system, the N-R control valve 24' is able to control the pressure operating on the fourth friction member C4, which is a low-reverse brake, to prevent shift shock when shifting the select lever from the neutral N range to the reverse R range, and from the parking P range to the reverse R range.

The N-R control valve 24' of the prior art, as shown in FIG. 5, includes a first port 100 for receiving hydraulic pressure from the manual valve 16, a second port 102 for receiving hydraulic pressure that has been reduced in the reducing valve 14, and a third port 104 communicating with the fourth friction member C4.

A valve spool 106 is provided in the N-R control valve 24'. The valve spool 106 includes a first land 108 for selectively allowing fluid communication between the first and third ports 100 and 104, and a second land 110 receiving the hydraulic pressure supplied to the second port 102. An elastic member 112 is mounted to the left (in the drawing) of the first land 108 such that force is exerted against the valve spool 106 in a rightward direction (in the drawing).

Through the above structure, the N-R control valve 24' is operated by the duty control of the third solenoid valve S3, and generates reduced control pressure by the third solenoid valve S3 releasing pressure.

Accordingly, oil is irregularly exhausted, as shown in FIG. 6, through an exhaust port Ex of the third port 104. This leads to the unstable control of hydraulic pressure such that shift shock occurs when shifting from the neutral N range to the reverse R range and from the parking P range to the reverse R range.

SUMMARY OF THE INVENTION

One object of the present invention is to overcome the problems and disadvantages discussed above. Another object of the present invention is to provide a control valve of a hydraulic control system for automatic transmissions which minimizes the variation in control pressure by equally discharging oil. As a result, stabilization of control pressure is realized to reduce shift shock.

A further object of the present invention is to provide an N-R control valve of a hydraulic control system for automatic transmissions which minimizes the variation in control pressure by equally discharging oil when manually shifting from a neutral N range to a reverse R range, and from a parking P range to the reverse R range.

These and other objects are achieved by providing a control valve, comprising: a valve body having a first, second and third port; and a valve spool disposed in said valve body and having a first and second end, said valve spool including a first, second and third land, said first land disposed at said first end for receiving hydraulic pressure supplied via said first port to bias said valve spool in a first direction, said second land for allowing fluid communication between said second and third ports when said valve spool is biased in said first direction, and said third land being disposed between said first and second land and including a passage which allows fluid communication between each side of said third land.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Preferred embodiments of the present invention will now be described in detail with reference to the accompanying drawings.

Figure 1:
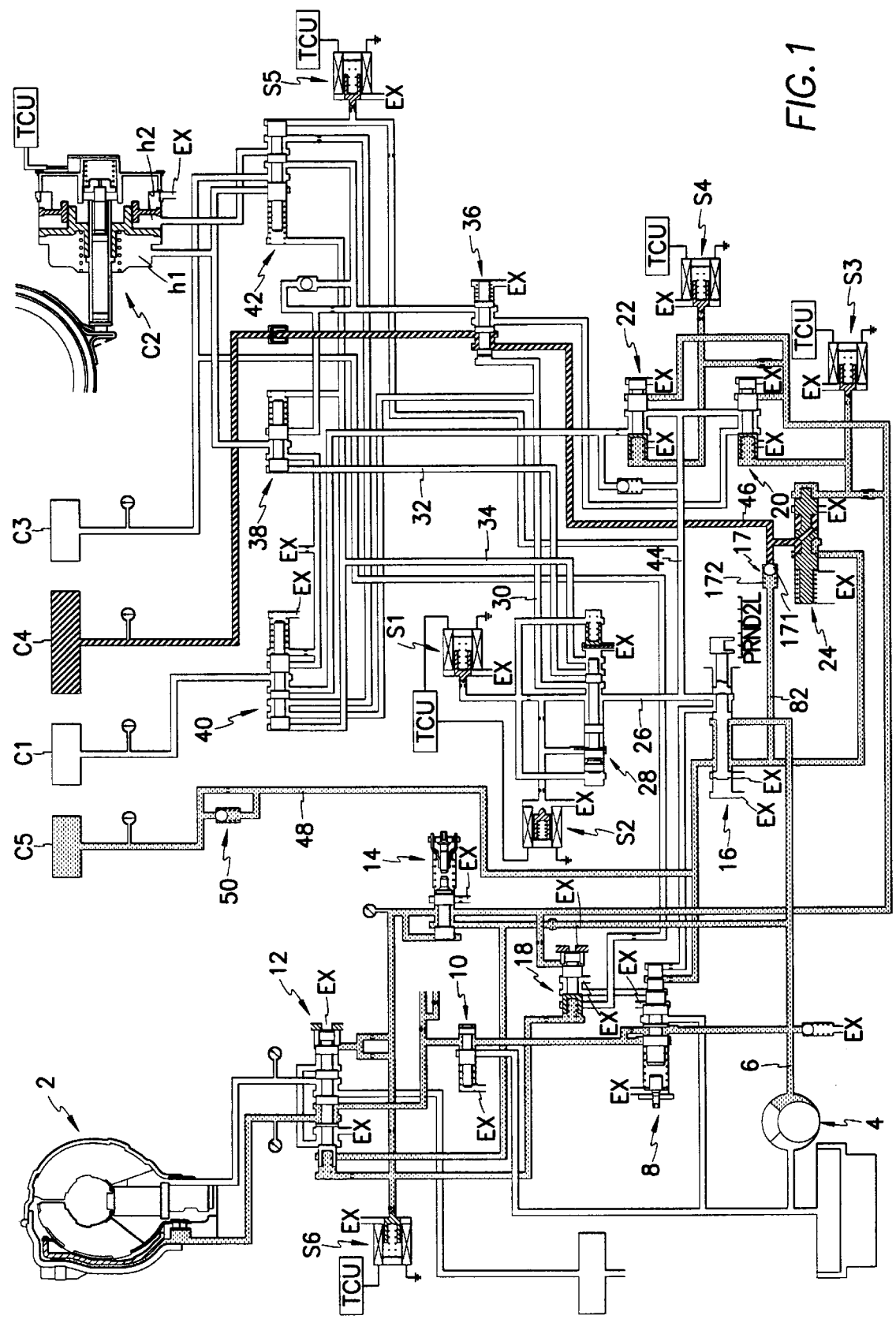
FIG. 1 is a hydraulic circuit diagram of a hydraulic control system according to a preferred embodiment of the present invention.
Figure 2:
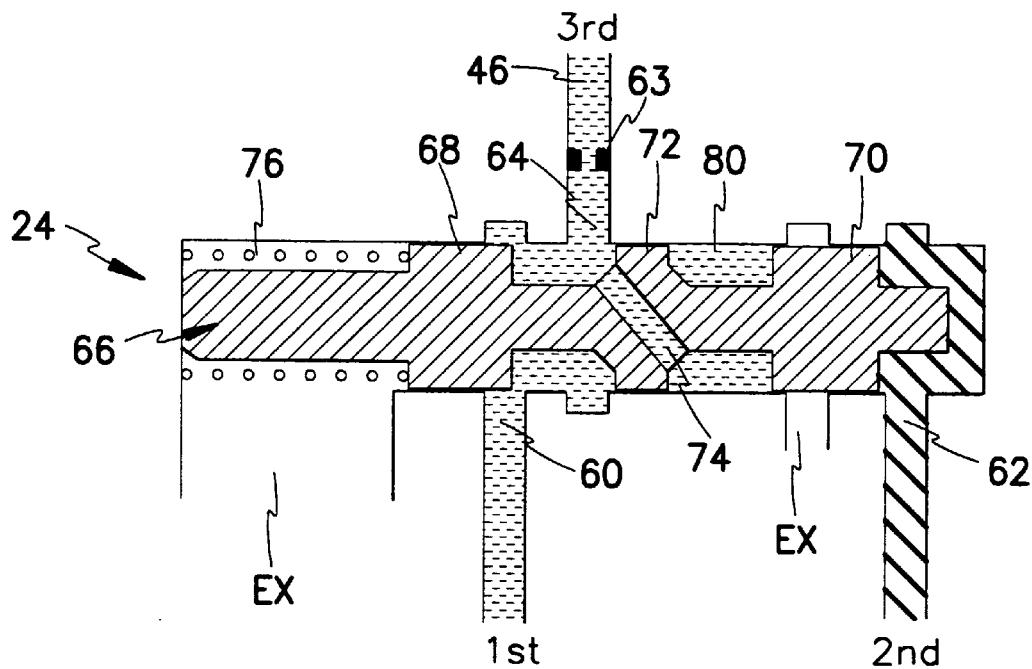
FIG. 2 is a schematic view of an N-R control valve appearing in FIG. 1 according to a preferred embodiment of the present invention.
Figure 7:
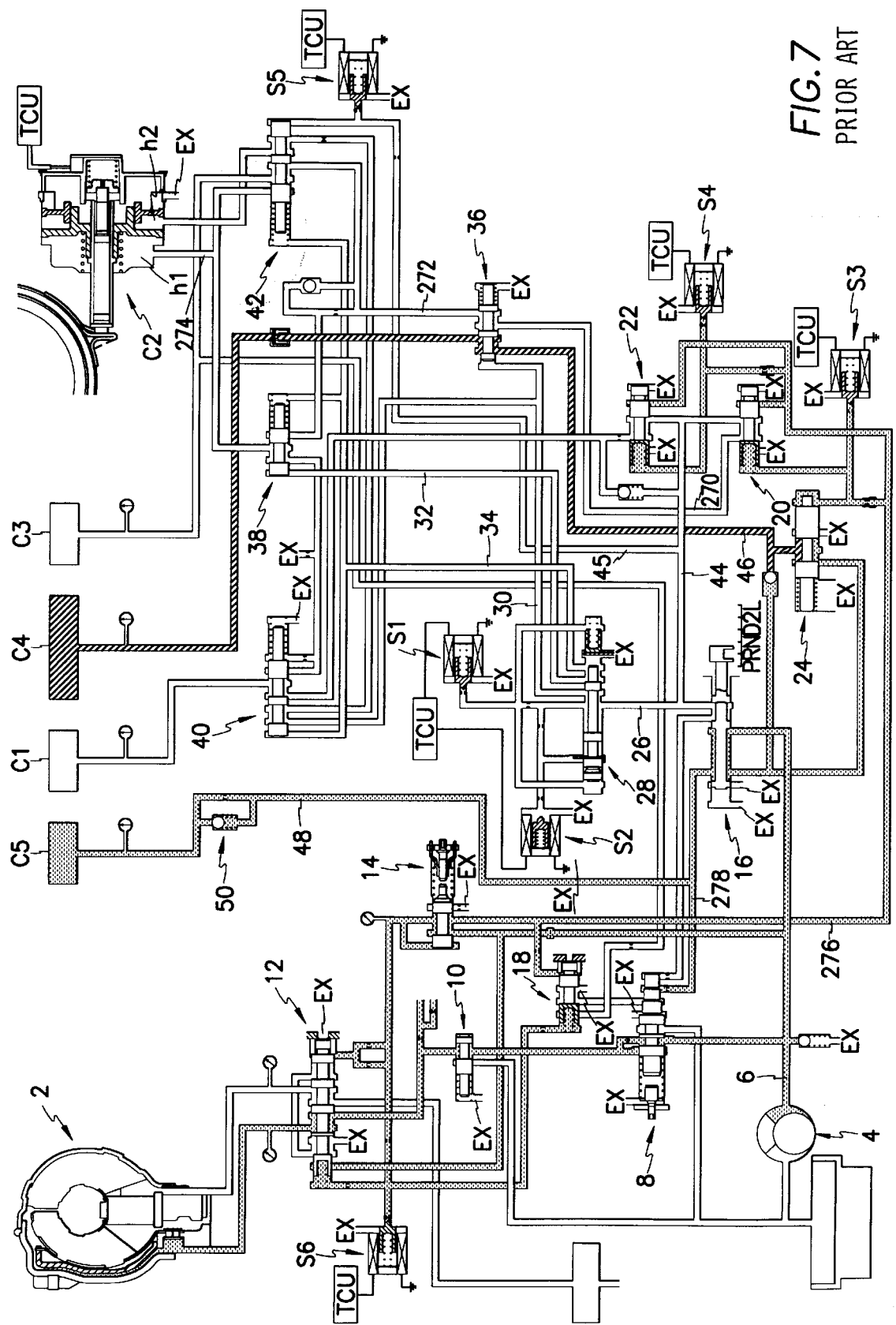
FIG. 7 is a hydraulic circuit diagram of a hydraulic control system applying the prior art N-R control valve.

FIG. 1 illustrates the hydraulic circuit diagram of FIG. 7 applying an N-R control valve 24 of the present invention, and FIG. 2 illustrates the N-R control valve 24 of FIG. 1 according to a preferred embodiment of the present invention. As shown in FIG. 2, the X-R control valve 24 incldes a first port 60 for receiving hydraulic pressure from a manual valve 16, a second port 62 for receiving reduced pressure from a reducing valve 14, and a third port 64 communicating with a fourth friction member C4.

There is also provided a valve spool 66 mounted in the N-R control valve 24. The valve spool 66 includes a first land 68 for selectively interconnecting the first and third ports 60 and 64, a second land 70 receiving hydraulic pressure supplied to the second port 62, and a third land 72 formed between the first land 68 and the second land 70. The third land 72 includes an orifice 74.

The orifice 74 is formed at an incline in the third land 72 such that one opening opens toward an exit port EX formed on a valve body 80 of the N-R control valve 24 and another opening opens toward the third port 64. As a result, the hydraulic pressure of the third port 64 is able to be exhausted through the exit port EX by passing through the orifice 74.

Also, an elastic member 76 is mounted to one side of the first land 68 such that the valve spool 66 receives a constant exertion of force to the right (in the drawing).

In addition, formed at the third port 64 in the reverse first control line 46 is a reduced diameter portion 63 to stabilize hydraulic pressure.

When a select lever (not shown) is positioned at a reverse R range, the hydraulic control system, as shown in FIG. 1 supplies part of the hydraulic pressure supplied to the manual valve 16 to a to a 1-2 shift valve 36 through a reverse first control line 46 via the N-R control valve 24. In this way, a valve spool of the manual valve 16 is moved to the right (in the drawing) such that, in reverse, hydraulic pressure is supplied to the fourth friction member C4, acting as a reaction member.

Also, part of the hydraulic pressure is supplied to a fifth friction member C5, operating as an input member, through a reverse second control line 48 to complete reverse control.

In the above shifting process, the N-R control valve 24, according to the duty control of a third solenoid valve S3, changes the pressure of the third port 64 and controls the hydraulic pressure of the fourth friction member C4.

As shown in FIG. 2, the hydraulic pressure supplied to the fourth friction member C4, according to the level of duty control of the third solenoid valve S3, moves the valve spool 66 of the N-R control valve 24 to the left (in the drawing), from a right ward position, against the tension of the elastic member 76 such that the first and third ports 60 and 64 are interconnected to allow the supply of hydraulic pressure therebetween.

Figure 3:
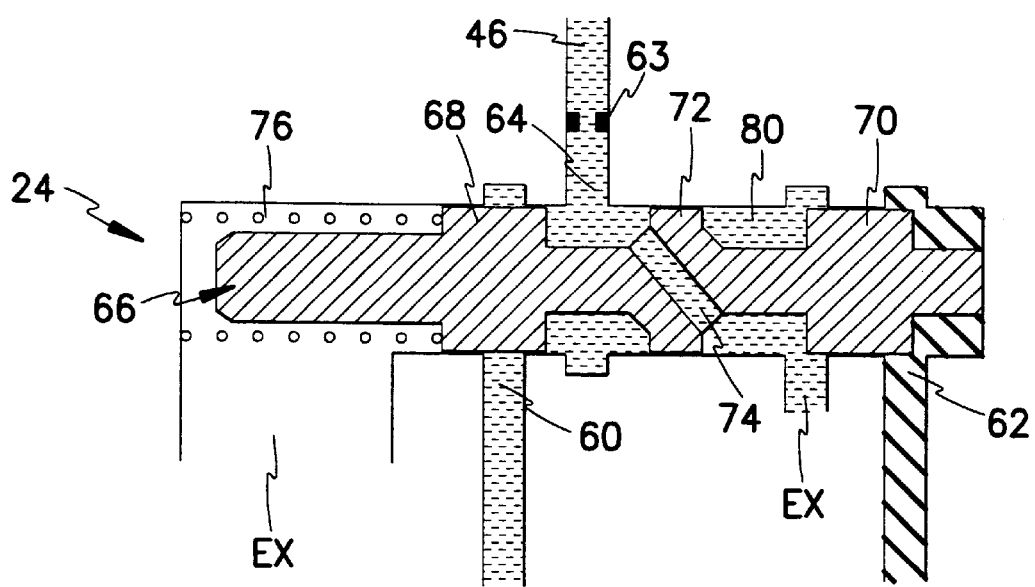
FIG. 3 is a schematic view of the N-R control valve of FIG. 2 in a state where oil is being exhausted.

Further, when the hydraulic pressure of the third port 64 is controlled according to the duty control of the third solenoid valve S3, the valve spool 66, as shown in FIG. 3, moves to the right (in the drawing). In this state, the third port 64 communicates with the exit port EX, and depending on how long this state is maintained either low pressure control or high pressure control is realized. That is, if the valve spool 66 is maintained in the above right ward state for a long period of time, low pressure control is realized, while if the duration of exhaust time is short, high pressure control is realized.

Figure 4:
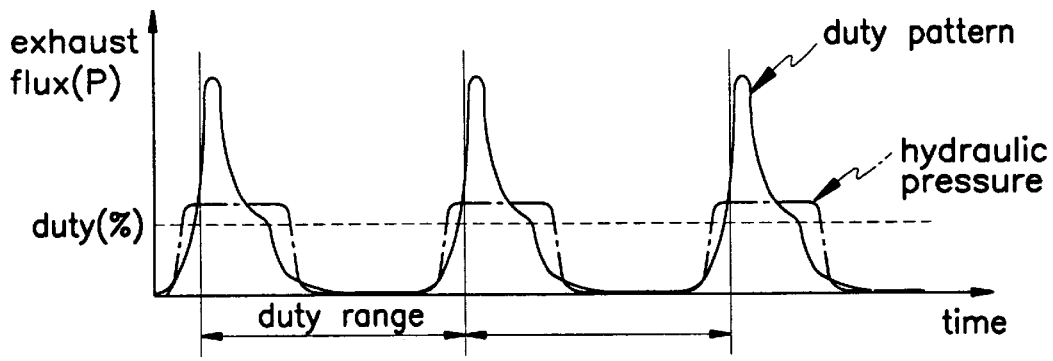
FIG. 4 is a drawing graphically illustrating an oil discharge state of the N-R control valve of FIG. 1 according to a preferred embodiment of the present invention.
Figure 5:
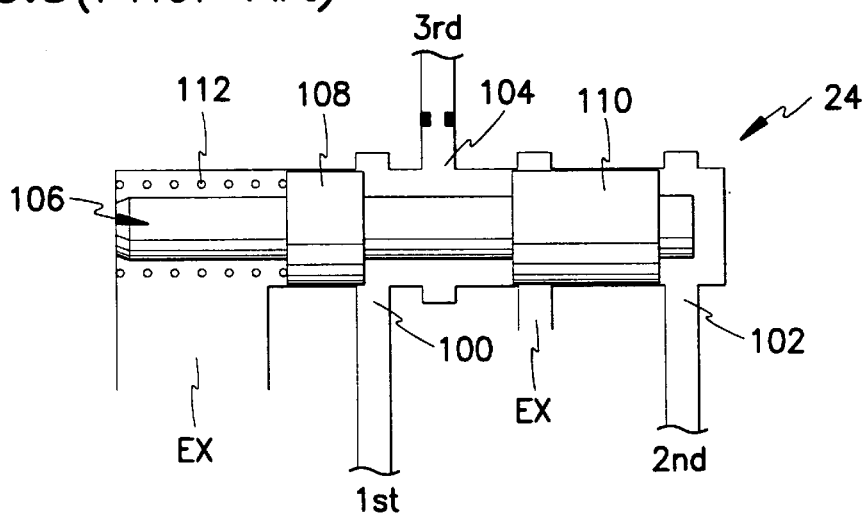
FIG. 5 is a schematic view of the prior art N-R control valve.
Figure 6:
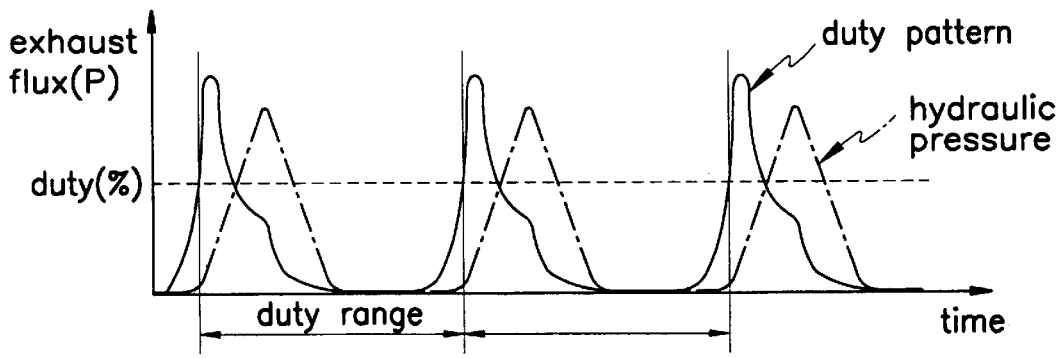
FIG. 6 is a drawing graphically illustrating an oil discharge state of the prior art N-R control valve of FIG. 5.

Referring now to FIG. 4, if a duty value is high, the exhaust time is long to realize low pressure control, while if the duty value is low, exhaust time is short to realize high pressure control.

In addition, in a line 82, branching off from the reverse first control line 46 and connected to the manual valve 16, a check valve 17 is mounted so as to stabilize hydraulic pressure supplied to the friction member C4 thereby reducing the shift shock. The check valve 17 includes a ball 171 and a spring 172 biasing the ball 171 towards the reverse first control line 46

In the above exhaust process, via the orifice 74 formed in the third land 72, oil is discharged at an equal and steady rate as shown in FIG. 4 such that fluctuations in control pressure are minimized, resulting in stabilized pressure.

As a result, shift shock is greatly reduced when manually shifting from the neutral N range to the reverse R range, and from the parking P range to the reverse range.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a hydraulic control circuit of an automatic vehicle transmission, a neutral-to-reverse control valve, comprising:

a valve body having a first port for receiving hydraulic pressure from a manually operated valve in the circuit, a second port for receiving hydraulic pressure from a reducing valve in the circuit, and a third port in hydraulic communication with a friction element in the transmission at least partly by way of a first line;

a valve spool movably disposed in said valve body and having a first and second end, said valve spool including a first land arranged so as to selectively communicate said first and third ports, a second land upon which the hydraulic pressure supplied to said second port is applied so as to bias said valve spool in a first direction whereby said first land communicates said first and third ports, and a third land provided intermediate said first and second lands and including a passage formed therethrough communicating opposing sides of said third land.

2. The control valve of claim 1, further comprising:

biasing means for biasing said valve spool in a second direction, opposite said first direction.

3. The control valve of claim 2, wherein said biasing means includes a spring.

4. The control valve of claim 1, wherein said first line is connected to said third port, said first line having a reduced diameter portion.

5. The control valve of claim 1, further comprising:

a second line branching from said first line and including a check valve biased towards said first line, said second line receiving hydraulic pressure supplied to said first port.

6. The control valve of claim 1, wherein said passage is diagonal through said third land.

7. The control valve of claim 1, wherein said valve body further includes an exhaust port; and said passage is arranged to allow fluid communication between said exhaust port and said third port when said valve spool is biased in a second direction, opposite said first direction.

8. The control valve of claim 7, further comprising:

biasing means for biasing said valve spool in a second direction, opposite said first direction.

* * * * *